United States Patent
Maeda et al.

(10) Patent No.: US 7,021,411 B2
(45) Date of Patent: Apr. 4, 2006

(54) FRONT END STRUCTURE OF VEHICLE WITH LABYRINTH STRUCTURE FORMING MEANS FOR COOLING AIR TO A RADIATOR

(75) Inventors: Noriaki Maeda, Kariya (JP); Ikuo Ozawa, Toyoake (JP); Toshiki Sugiyama, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/378,208

(22) Filed: Mar. 3, 2003

(65) Prior Publication Data

US 2003/0168270 A1 Sep. 11, 2003

(30) Foreign Application Priority Data

Mar. 6, 2002 (JP) ............................. 2002-060733
Jul. 26, 2002 (JP) ............................. 2002-217889

(51) Int. Cl.
*B60K 11/04* (2006.01)
(52) U.S. Cl. ................. 180/68.4; 296/208; 296/203.02
(58) Field of Classification Search ............... 180/68.1, 180/68.3, 68.4, 68.6; 293/115, 117; 296/193.1, 296/203.02, 193.09, 208; 165/41, 134.1
See application file for complete search history.

(56) References Cited

U.S. PATENT DOCUMENTS

| | | | | |
|---|---|---|---|---|
| 4,533,012 A | * | 8/1985 | Komoda | 180/68.3 |
| 4,566,407 A | * | 1/1986 | Peter | 123/41.48 |
| 4,653,788 A | * | 3/1987 | Di Giusto | 293/117 |
| 4,940,100 A | * | 7/1990 | Ueda | 180/68.1 |
| 5,046,550 A | * | 9/1991 | Boll et al. | 165/41 |
| 5,269,367 A | * | 12/1993 | Susa et al. | 165/41 |
| 5,409,288 A | * | 4/1995 | Masuda | 296/193.09 |
| 5,427,502 A | * | 6/1995 | Hudson | 415/211.1 |
| 5,551,505 A | * | 9/1996 | Freeland | 165/41 |
| 5,588,482 A | * | 12/1996 | Holka | 165/44 |
| 6,186,583 B1 | * | 2/2001 | Martin | 296/193.09 |
| 6,315,034 B1 | * | 11/2001 | Mahe et al. | 165/121 |
| 6,578,650 B1 | * | 6/2003 | Ozawa et al. | 180/68.1 |
| 6,622,808 B1 | * | 9/2003 | Sasano et al. | 180/68.3 |
| 2001/0026082 A1 | | 10/2001 | Ozawa et al. | |

* cited by examiner

*Primary Examiner*—Christopher P. Ellis
*Assistant Examiner*—Kelly E Campbell
(74) *Attorney, Agent, or Firm*—Harness, Dickey & Pierce, PLC

(57) ABSTRACT

A clearance 44 is provided between the outer periphery of a duct 42 and a vehicle body, that is, a radiator support 50 and, at the same time, the clearance 44 is made to have a labyrinth structure. In this structure, it is possible to prevent vibrations of the vehicle body from being propagated from the radiator support 50 to the duct 42 while preventing a current of air, such as one caused by movement of the vehicle, from flowing around heat exchangers, such as a radiator 10, and flowing downstream through the clearance 44. Therefore, it is possible to improve the cooling performance of heat exchangers such as the radiator 10 while preventing the duct 42, that is, a duct shroud 40 from being damaged by vibration.

7 Claims, 6 Drawing Sheets

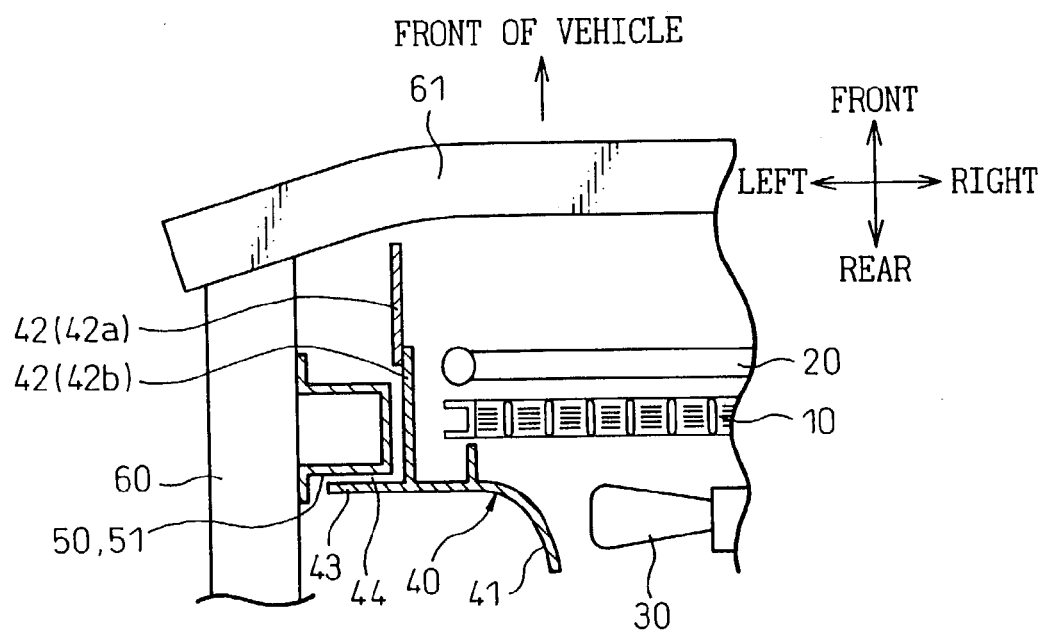
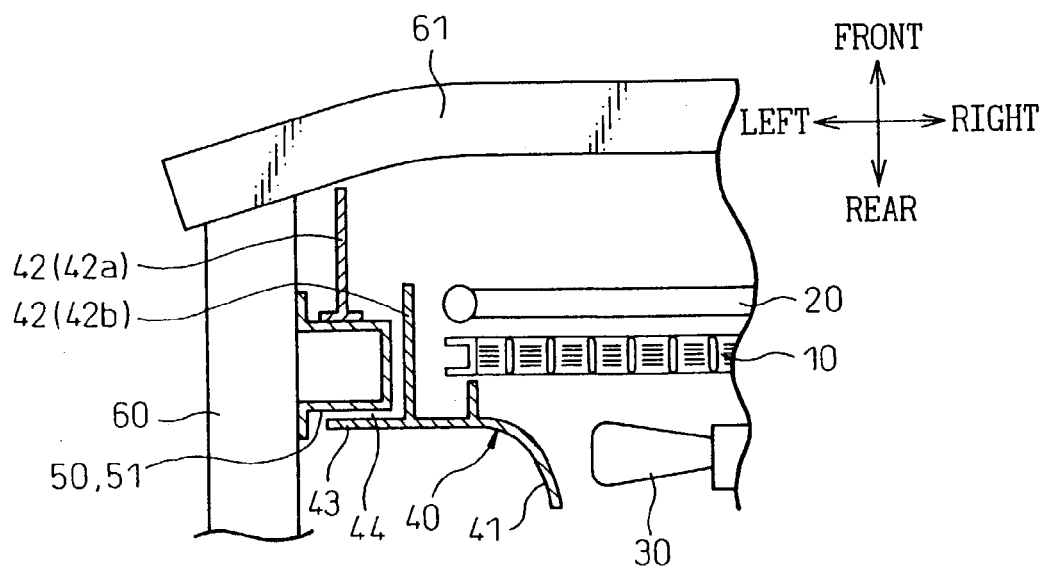

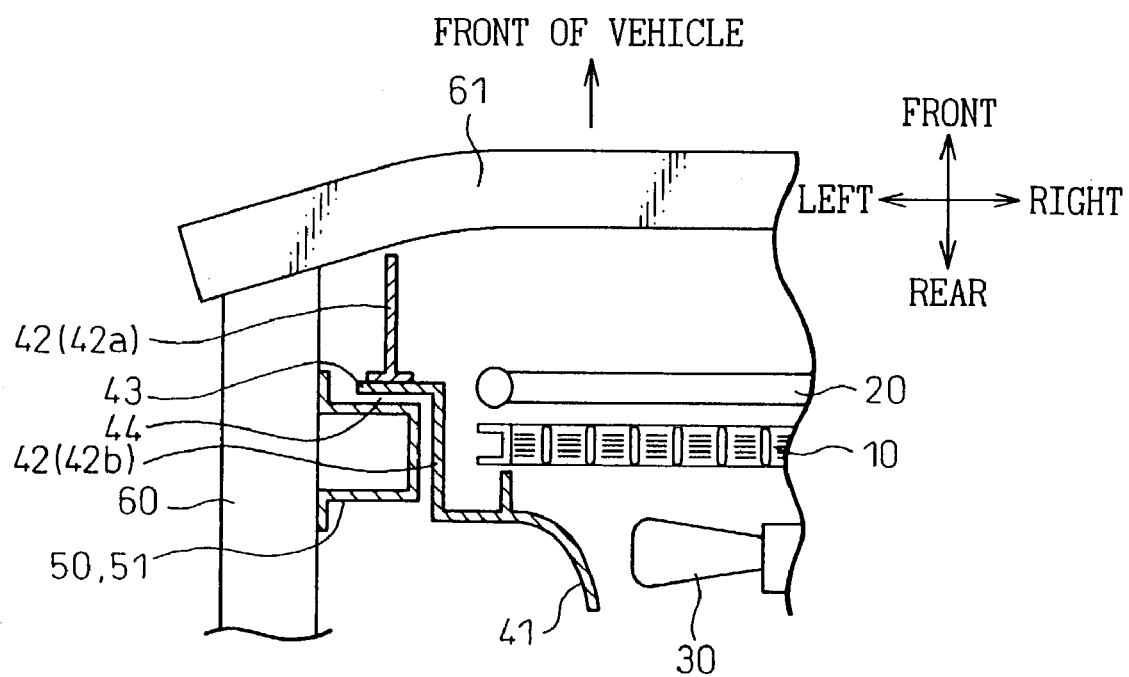

FRONT END STRUCTURE OF VEHICLE WITH LABYRINTH STRUCTURE FORMING MEANS FOR COOLING AIR TO A RADIATOR

BACKGROUND OF THE INVENTION

1. Field of the Invention

The present invention relates to a front end structure of a vehicle.

2. Description of the Related Art

In a general front end structure, a shroud is provided in order to prevent a current of air caused by an air blower from flowing around a radiator but, as the shroud forms a kind of an air duct connecting the radiator and the air blower, it is impossible to direct the current of air, which is created by movement of a vehicle and flows through a clearance between the radiator and the vehicle body, to the radiator, though the current of air caused by the air blower passes through the radiator without fail.

Contrary to this, in the invention disclosed in Japanese Patent No. 3191385, air is prevented from flowing through a clearance between a heat exchanger (a radiator etc.) and the vehicle body by providing a rectangular pipe-shaped duct that covers the outer peripheral part of the heat exchanger and, at the same time, by fastening the outer peripheral part of the duct to the vehicle body.

In the invention disclosed in the publication described above, however, as the outer peripheral part of the duct is fastened to the vehicle body, vibrations of the vehicle body are propagated to the duct and there is a possibility that the part where the duct and the vehicle body are fastened together will be damaged.

SUMMARY OF THE INVENTION

The above-mentioned problem being taken into account, the objective of the present invention is to provide a novel structure different from the conventional one to improve the cooling performance of a radiator while solving the above-mentioned problem.

In order to achieve the above-mentioned objective, the first aspect of the present invention comprises an air blower (30) that supplies cooling air to a radiator (10), a shroud (41) that prevents the current of air created by the air blower (30) from flowing around the radiator (10), a duct (42) that covers the outer periphery of the radiator (10), with its inside being continuously communicated with the shroud (41), and a labyrinth structure forming means (43) that is continuously communicated with the outer periphery of the duct (42) and forms a labyrinth-structured clearance (44) between the outer periphery of the duct (42) and a vehicle body (50).

In this structure, it is possible to prevent vibrations of the vehicle body (50) from being propagated to the duct (42) while preventing a current of air such as one created by movement of a vehicle from flowing around heat exchangers, such as the radiator (10), through the clearance (44) and flowing downstream. Therefore, it is possible to improve the cooling performance of heat exchangers such as the radiator (10) while preventing the duct (42) from being damaged by vibrations.

In the second aspect of the present invention, the labyrinth structure forming means (43) is composed of a wall member extending from the duct (42) to the side of the vehicle.

In the third aspect of the present invention, the labyrinth structure forming means (43) forms the labyrinth-structured clearance (44) between itself and a pillar (51) that is a part of the vehicle body (50) and extends vertically.

It is preferable that the shroud (41), the duct (42) and the labyrinth structure forming means (43) are integrally formed by integral molding, as shown in the fourth aspect of the present invention.

Moreover, it is preferable that the shroud (41), the duct (42) and the labyrinth structure forming means (43) are integrally formed by integral molding using a resin member, as shown in the fifth aspect of the present invention.

In the sixth aspect of the present invention, after a part of the duct (42) near the shroud (41) and the other part of the duct (42) near the point are separately manufactured, the part of the duct (42) near the point is attached to the part of the duct (42) near the shroud (41).

The present invention may be more fully understood from the description of the preferred embodiments of the invention set forth below, together with the accompanying drawings.

BRIEF DESCRIPTION OF THE DRAWINGS

In the drawings:

FIG. 5 is a sectional view, when viewed from the top, of a structure where a radiator and a duct shroud are fixed in a front end structure of a vehicle in a third embodiment of the present invention.

FIG. 6 is a sectional view, when viewed from the top, of a structure where a radiator and a duct shroud are fixed in a front end structure of a vehicle in a fourth embodiment of the present invention.

FIG. 7 is a sectional view, when viewed from the top, of a structure where a radiator and a duct shroud are fixed in a front end structure of a vehicle in a fifth embodiment of the present invention.

DESCRIPTION OF THE PREFERRED EMBODIMENTS (First Embodiment)

Figure 1:
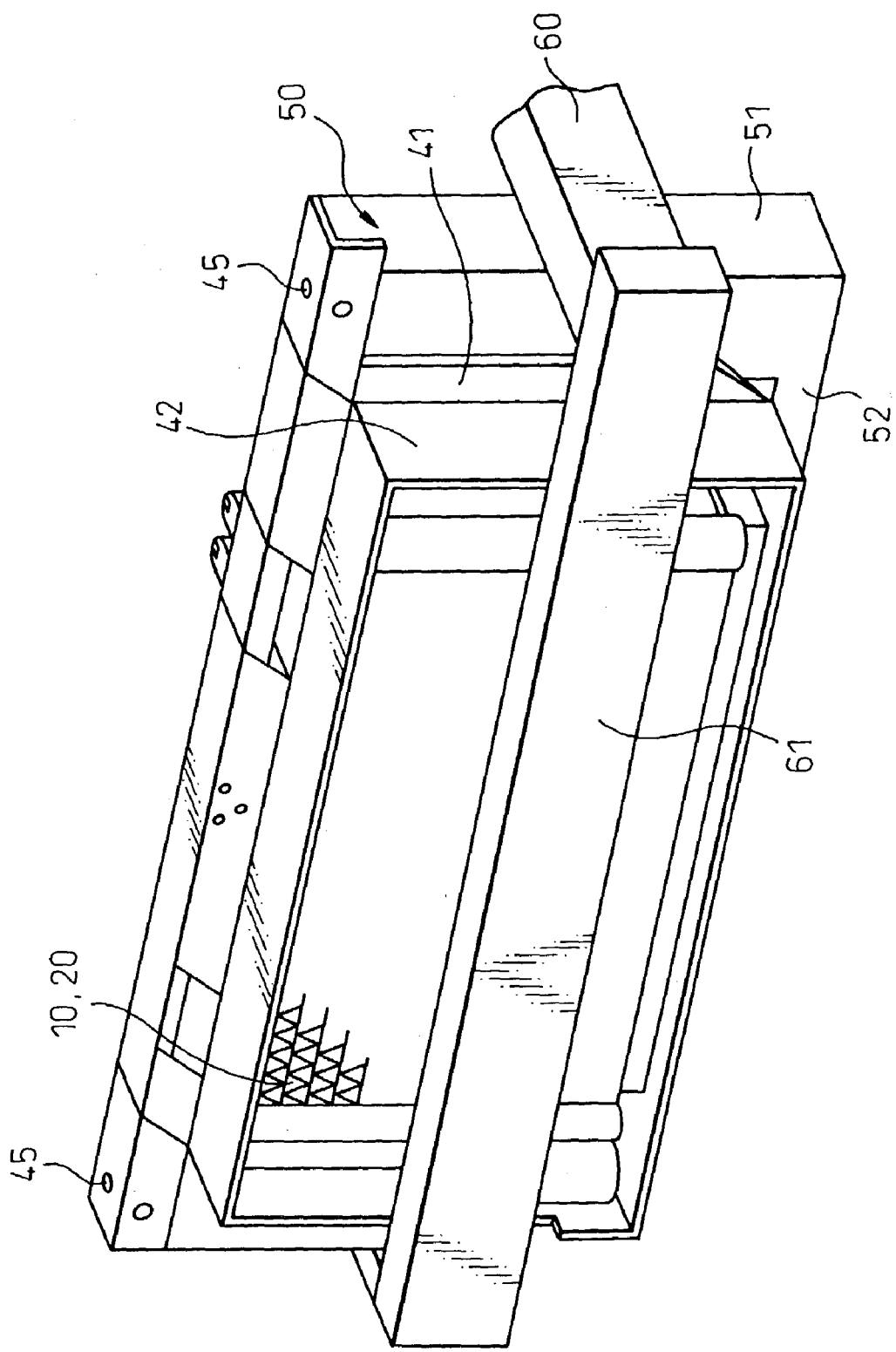
FIG. 1 is a perspective view that shows a front end structure of a vehicle in a first embodiment of the present invention.
Figure 2:
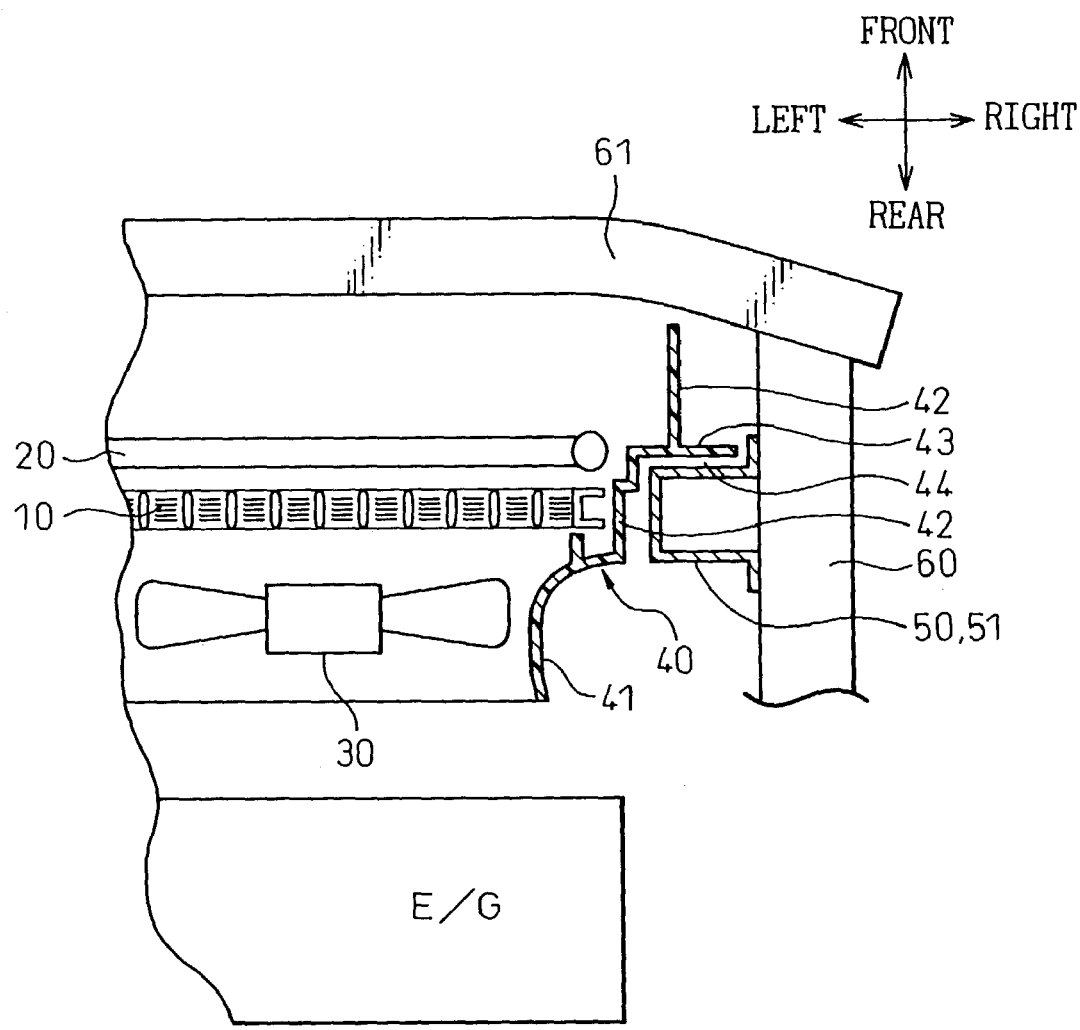
FIG. 2 is a sectional view, when viewed from the top, of a structure where a radiator and a duct shroud are fixed in the front end structure of a vehicle in the first embodiment of the present invention.
Figure 3:
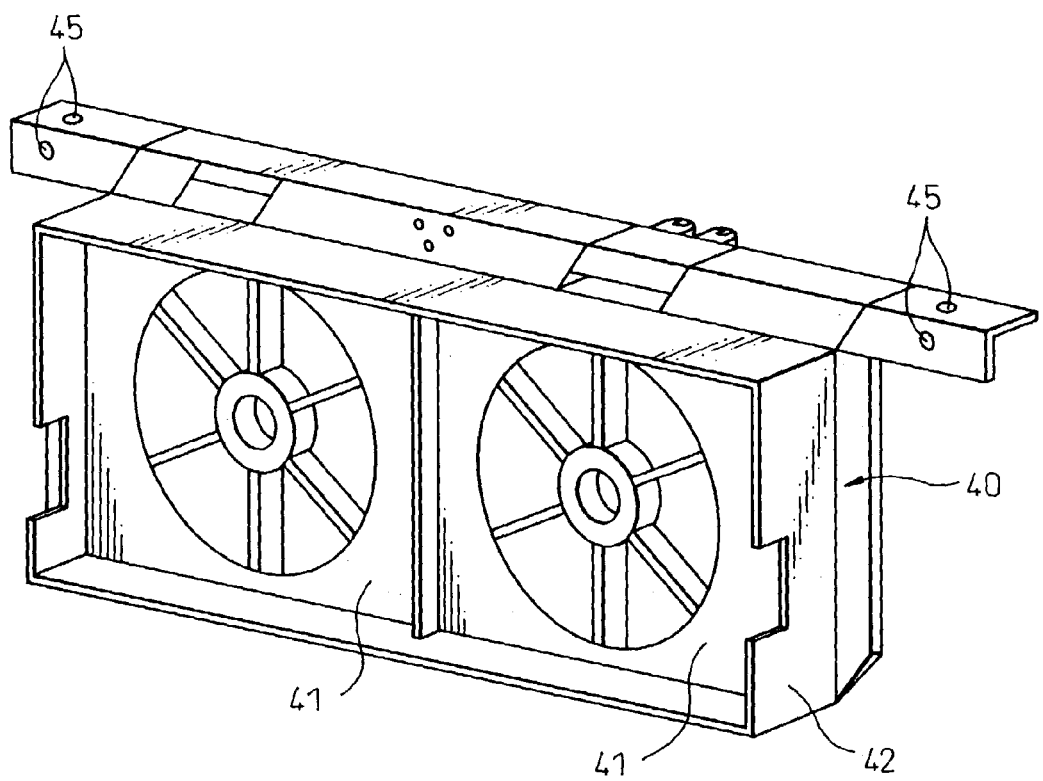
FIG. 3 is a perspective view of the duct shroud adopted in the front end structure of a vehicle in the first embodiment of the present invention.
Figure 4:
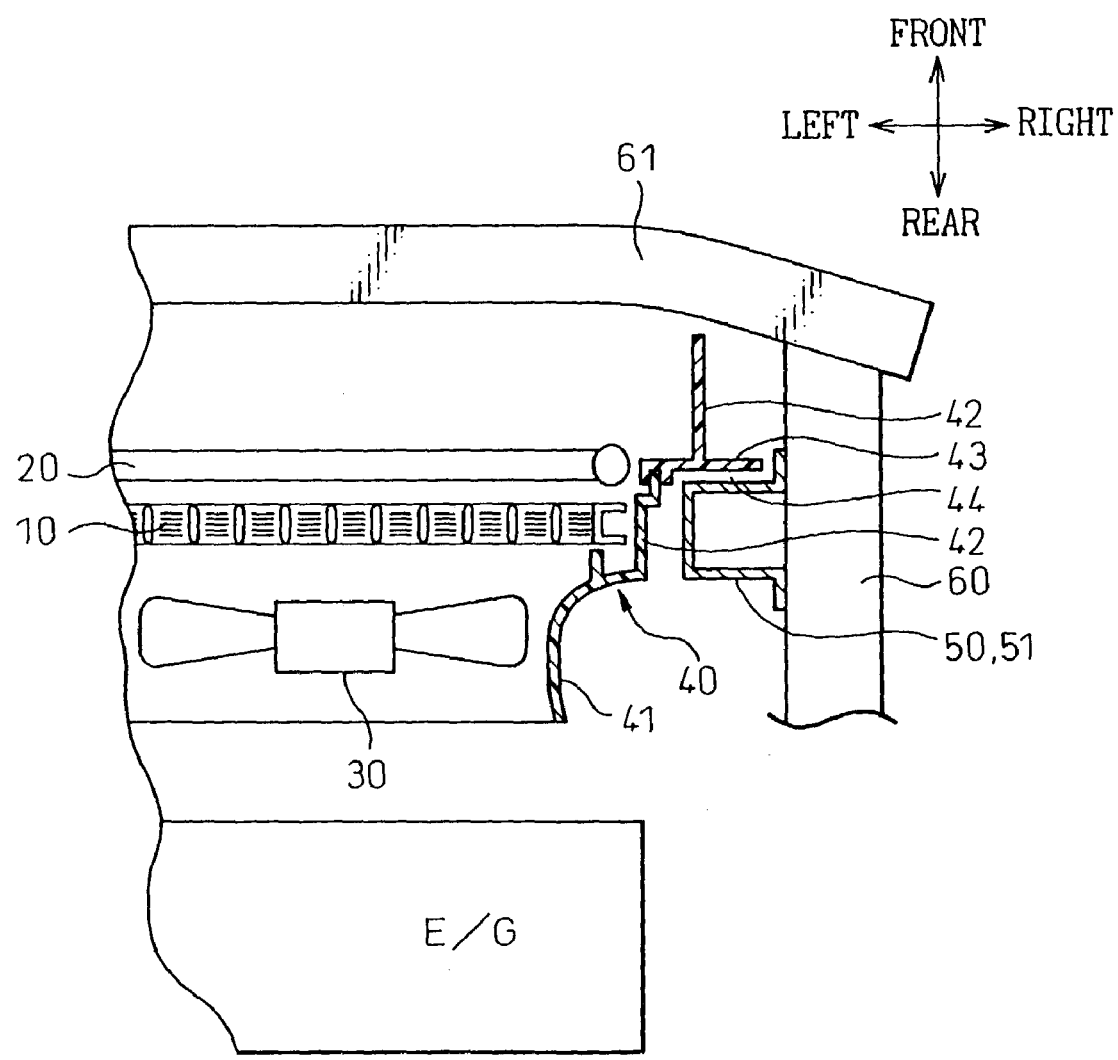
FIG. 4 is a sectional view, when viewed from the top, of a structure where a radiator and a dust shroud are fixed in a front end structure of a vehicle in a second embodiment of the present invention.

FIG. 1 is a perspective view of the front end structure of a vehicle in the prevent embodiment, FIG. 2 is a sectional view, when viewed from the top, of a structure where a radiator 10 and a duct shroud 40 are fixed, and FIG. 3 is a perspective view of the duct shroud 40.

In FIG. 1, the radiator 10 is a heat exchanger that exchanges heat between engine cooling water and air and there is mounted a condenser 20, which is an outside heat exchanger of an air conditioner, on the upstream side of the radiator 10, as shown in FIG. 2. The condenser 20 is fixed to a header tank of the radiator 10 so that it can be removed and attached by a mechanical fastening means such as bolts.

An air blower 30 is an axial-flow fan type, which is arranged on the downstream side of the radiator 10 and supplies cooling air to the radiator 10 and the condenser 20, a shroud 41 is a kind of cover, which prevents a current of air created by the air blower 30 from flowing around the radiator 10 by covering the outer periphery of the air blower 30 and the clearance between the radiator 10 and the air blower 30, and the air blower 30 is fixed to the vehicle body via the shroud 41.

The duct 42 is a rectangular pipe-shaped duct and is constructed by extending the end of the shroud 41 near the radiator 10 to the front side of the vehicle, that is, the upstream side, beyond the radiator 10 in such a way as to cover the outer periphery of the radiator 10 and the condenser 20 (refer to FIG. 1), and its inside is continuously communicated with the shroud 41.

On the outer wall of the duct 42, a wall-shaped flange 43 that spreads outward (toward the side of the vehicle) from the duct 42 is provided, and the flange 43 forms a labyrinth structure forming means that forms a crank-shaped labyrinth structured clearance 44 between itself and a radiator support 50 that is a part of the vehicle body.

A labyrinth structure is, as widely known, a kind of a mechanical seal structure that has a duct structure in which a loss of pressure is sufficiently large during flow.

In the present embodiment, the shroud 41, the duct 42 and the flange 43 are integrally formed by integral molding using a resin whose mechanical strength has been increased by carbon fibers, glass fibers, or the like. This integrally formed body is called the duct shroud 40 hereinafter.

The radiator support 50, as shown in FIG. 1, is a substantially reverse C-shaped frame composed of a pillar 51 that extends vertically and is fixed to a side member 60, which extends in the longitudinal direction of the vehicle at the side of the vehicle and forms a part of the vehicle body, by welding or using bolts, and a beam 52 that is connected to the bottom of the pillar 51 and extends horizontally. In the present embodiment, the radiator support 50 forms the labyrinth-structured clearance 44 by arranging the flange 43 in front of the pillar 51.

The duct shroud 40 is fixed to the radiator support 50 by fixing the mounting portion 45 provided on the top end of the duct shroud 40 to the top end of the pillar 51 by using bolts, as shown in FIG. 1 and FIG. 3.

In FIG. 1, a bumper reinforcement 61 is a beam-shaped shock absorbing member that extends horizontally at the front side of the vehicle and is fixed to the side member 60.

The vehicle body, that is, the radiator support 50, the side member 60 and the bumper reinforcement 61 are made of metal (for example, aluminum alloy).

Next, the functions and effects of the present embodiment are described below.

According to the present embodiment, it is possible to prevent vibrations of the vehicle body from being propagated from the radiator support 50 to the duct 42 while preventing a current of air such as one caused by movement of the vehicle from flowing around heat exchangers such as the radiator 10 and flowing downstream through the clearance 44, because the clearance 44 is provided between the outer periphery of the duct 42 and the vehicle body, that is, the radiator support 50 and, at the same time, the clearance 44 is made to have a labyrinth structure.

Therefore, it is possible to improve the cooling performance of heat exchangers such as the radiator 10 while preventing the duct 42, that is, the duct shroud 40, from being damaged by vibration.

(Second Embodiment)

Although the flange 43 is integrally formed into the duct 42 in the first embodiment, in the present embodiment, after the flange 43 and a part of the duct 42 are separately manufactured, the flange 43 is integrally formed into the duct shroud 40 by means of mechanical fastening structures such as one in which screws or claws are inserted, or by welding.

(Third Embodiment)

In the embodiment described above, the labyrinth-structured clearance 44 is formed by arranging the flange 43 in front of the pillar 51 but, in the present embodiment, the labyrinth-structured clearance 44 is formed by arranging the flange 43 behind the pillar 51, as shown in FIG. 5.

In the present embodiment however, as a part 42b of the duct 42 near the shroud 41 and a part 42a of the duct 42 near the point (front end) are formed into one body by a mechanical tightening means, welding, or the like after they are manufactured separately, it is possible to repair or replace with ease only the part 42a near the point that is easily damaged in a collision. Therefore, it is possible to suppress a rise in the repair cost while enhancing replacement efficiencies after a collision.

(Fourth Embodiment)

The present embodiment is a variant of the third embodiment, that is, in concrete terms, the part 42a of the duct 42 near the point (front end) is attached to and fixed to the pillar 51 as a separate body, as shown in FIG. 6.

In this structure, it is possible to suppress a rise in the repair cost while enhancing replacement efficiencies after a collision because only the part 42a, near the point that is easily damaged in a collision, can be repaired or replaced easily.

(Fifth Embodiment)

In the present embodiment, the part 42a of the duct 42 near the point that is easily damaged in a collision is manufactured separately and at the same time, the part 42a of the duct 42 near the point is integrally formed with the flange 43 by means of a mechanical fastening means or by welding, as shown in FIG. 7.

In this structure, it is possible to suppress a rise in the repair cost while enhancing replacement efficiencies after a collision because only the part 42, near the point that is easily damaged in a collision, can be repaired or replaced easily.

(Other Embodiments)

Although the shroud 41, the duct 42 and the flange 43 are integrally formed by integral molding in the first embodiment, the present invention is not limited to this, but it is also possible to form them integrally by means of mechanical fastening structures such as one in which screws and claws are inserted, or by welding after manufacturing them separately.

Although the shroud 41, the duct 42 and the flange 43 are integrally molded by using a resin whose mechanical strength has been increased by carbon fibers, glass fibers, or the like, in the embodiments described above, the present invention is not limited to this, but they may be integrally formed by metal casting such as aluminum die cast or plastic working such as press molding.

Although the air blower 30 is arranged on the downstream side of the radiator 10 in the embodiments described above, the present invention is not limited to this, but the air blower 30 may be arranged on the upstream side of the radiator 10.

Although the air blower comprising an axial-flow fan is adopted in the embodiments described above, the present invention is not limited to this, but the air blower 30 may comprise, for example, a cross-flow fan. The definitions of an axial-flow fan and a cross-flow fan are based on JIS (Japanese Industrial Standard) B 0132.

While the invention has been described by reference to specific embodiments chosen for the purposes of illustration, it should be apparent that numerous modifications could be made thereto by those skilled in the art without departing from the basic concept and scope of the invention.

What is claimed is:

1. A front end structure of a vehicle, comprising
   an air blower that supplies cooling air to a radiator,
   a shroud that prevents the current of air created by the air blower from flowing around the radiator,
   a duct that covers the outer periphery of the radiator and, at the same time, the inside of which is continuously communicated with the shroud, and
   labyrinth structure forming means that is attached to the duct and forms a first portion of a labyrinth structured clearance between the outer periphery of the duct and a vehicle body and a second portion of the labyrinth structured clearance between the outer periphery of the labyrinth structure forming means and the vehicle body, wherein
   the labyrinth structured clearance makes a front space located more forward than the radiator and a rear space located more rearward than the radiator, the front and rear space communicate with each other.

2. A front end structure of a vehicle, as set forth in claim 1, wherein the labyrinth structure forming means is composed of a wall member extending from the duct to the side of the vehicle.

3. A front end structure of a vehicle, as set forth in claim 1, wherein the labyrinth structure forming means forms the labyrinth structured clearance between the labyrinth structure forming means and a pillar that is a part of the vehicle body and extends vertically.

4. A front end structure of a vehicle, as set forth in claim 1, wherein the shroud, the duct and the labyrinth structure forming means are integrally formed by integral molding.

5. A front end structure of a vehicle, as set forth in claim 1, wherein the shroud, the duct and the labyrinth structure forming means are integrally formed by integral molding using a resin member.

6. A front end structure of a vehicle, as set forth in claim 1, wherein after a part of the duct near the shroud and the other part of the duct away from the shroud are manufactured separately, the part of the duct away from the shroud is attached to the other part of the duct near the shroud.

7. A front end structure of a vehicle as set forth in claim 1, wherein said labyrinth structured clearance extends beyond a front to rear width of the radiator.

* * * * *